United States Patent
Budmiger

[19]

[11] Patent Number: 6,031,740
[45] Date of Patent: Feb. 29, 2000

[54] METHOD OF REGULATING THE COIL CURRENT OF ELECTROMAGNETIC FLOW SENSORS

[75] Inventor: Thomas Budmiger, Ettingen, Switzerland

[73] Assignee: Endress + Hauser Flowtec AG, Reinach, Switzerland

[21] Appl. No.: 09/347,602

[22] Filed: Jul. 1, 1999

Related U.S. Application Data

[60] Provisional application No. 60/102,546, Sep. 30, 1998.

[30] Foreign Application Priority Data

Jul. 3, 1998 [EP] European Pat. Off. .............. 98112321

[51] Int. Cl.$^7$ ......................... H02H 7/122; H02M 3/335; H02M 3/24
[52] U.S. Cl. ............................... 363/58; 363/17; 363/98; 363/131
[58] Field of Search ................................. 363/17, 56, 58, 363/97, 132, 98, 131

[56] References Cited

U.S. PATENT DOCUMENTS

| | | | |
|---|---|---|---|
| 3,529,591 | 9/1970 | Schuette | 126/2.05 |
| 4,204,240 | 5/1980 | Schmoock | 361/152 |
| 4,410,926 | 10/1983 | Lafner et al. | 361/93 |
| 4,710,686 | 12/1987 | Guzik | 363/98 |
| 4,748,532 | 5/1988 | Commander et al. | 363/58 |
| 4,784,000 | 11/1988 | Gaertner | 73/861.12 |
| 4,916,381 | 4/1990 | Gelecinskyj et al. | 323/285 |
| 4,953,068 | 8/1990 | Henze | 363/98 |
| 5,018,058 | 5/1991 | Inonescu et al. | 363/34 |
| 5,233,509 | 8/1993 | Ghotbi | 363/89 |
| 5,257,175 | 10/1993 | Skelton et al. | 363/56 |
| 5,309,347 | 5/1994 | Poma et al. | 363/56 |
| 5,372,045 | 12/1994 | Schulz et al. | 363/17 |
| 5,379,209 | 1/1995 | Goff | 363/132 |
| 5,397,965 | 3/1995 | Gorille et al. | 315/209 R |
| 5,400,235 | 3/1995 | Carroll | 363/17 |
| 5,530,639 | 6/1996 | Schulz et al. | 363/98 |
| 5,545,971 | 8/1996 | Gomez et al. | 323/259 |
| 5,642,247 | 6/1997 | Giordano | 361/31 |
| 5,644,484 | 7/1997 | Elango | 363/98 |

*Primary Examiner*—Peter S. Wong
*Assistant Examiner*—Bao Q. Vu
*Attorney, Agent, or Firm*—Bose McKinney & Evans LLP

[57] ABSTRACT

This method completely eliminates the detrimental effect of eddy currents on the rise time of the magnetic field, so that it reaches its constant value already when the current assumes its maximum. The field is generated by a current flowing in a coil which forms part of a magnetic system contained in an electromagnetic flow sensor, which comprises a core and/or a pole piece. The current changes periodically its polarity thereby causing the eddy currents. The current flows in a H network of transistors (13, 14, 14, 16) or a T network of switching transistors (25, 26). A resistor (10, 10'; 22, 22') is series connected to the H or T network. In each current half-cycle, an initial voltage during a rise time of the current—as a first subcycle—which is higher than a final voltage during a second subcycle is fed to the coil. The voltage drop across the resistor is used to maintain the final voltage constant for forming the first and second final current values, and to compensate for the effect of the eddy currents. To do so, in each half-cycle the voltage drop across the resistor after the maximum of the coil current until the attainment of the final current is sampled at least three times in succession to form a correction quantity for the voltage across the H or T network in the next half-cycle.

4 Claims, 6 Drawing Sheets

METHOD OF REGULATING THE COIL CURRENT OF ELECTROMAGNETIC FLOW SENSORS

This application claims benefit of Provisional Application Ser. No. 60/102,546 filed Sep. 30, 1998.

FIELD OF THE INVENTION

This invention relates to a method of regulating the coil current of electromagnetic flow sensors.

BACKGROUND OF THE INVENTION

This coil current flows in a coil assembly having an inductance L and forming part of a magnetic system which contains cores and/or pole pieces. In the first half of a cycle, the coil current is positive and has a constant first final value, and in the second half of the cycle, as a result of a changeover, it is negative and has a constant second final value equal in magnitude to the first final value.

The coil assembly is, for example, a single coil if the electromagnetic flow sensor serves as a flow probe, cf. U.S. Pat. No. 3,529,591, or consists of two coil halves disposed at diametrically-opposed positions on a measuring tube through which flows a fluid whose volumetric flow rate is to be measured.

U.S. Pat. No. 4,410,926 discloses a circuit arrangement for generating such a coil current. This arrangement comprises:
- a bridge circuit in the form of an H network having
  - a first bridge arm formed by the controlled current path of a first transistor,
  - a second bridge arm formed by the controlled current path of a second transistor,
  - a third bridge arm formed by the controlled current path of a third transistor, and
  - a fourth bridge arm formed by the controlled current path of a fourth transistor,
  - a first bridge diagonal between the second transistor, which is connected to the first transistor, and the fourth transistor, which is connected to the third transistor, and
  - a second bridge diagonal between the third transistor, which is connected to the first transistor, and the fourth transistor, which is connected to the second transistor, wherein
    - either the first and fourth transistors
    - or the second and third transistors are simultaneously on, whereby the coil current alternately reverses its direction;
- the aforementioned coil assembly, which lies in the first bridge diagonal;
- a controlled current source having an output for its current;
- a resistor which
  - has one end connected to ground,
  - is connected to the H network so as to form a series circuit, and
  - is traversed by the coil current;
- a diode inserted between the output of the current source and the series circuit, the forward direction of this diode being equal to the direction of the current of the current source; and
- a capacitor of capacitance C connected in parallel with the series circuit, this capacitor and the aforementioned inductance L forming a resonant circuit whose action is such that after each reversal of the coil current,
  - a resonant rise of the voltage across the H network occurs and,
  - during a rise of the coil current at the beginning of each of the aforementioned half-cycles, the coil current has a steeper leading edge than if the resonant circuit were not present.

U.S. Pat. No. 4,410,926 also discloses a circuit arrangement for generating a coil current which comprises a T network comprising:
- a resistor which
  - has one end connected to ground and is connected to the coil assembly so as to form a series circuit which is traversed by the coil current,
- a first switching transistor having a first terminal of its controlled current path connected to a second terminal of the series circuit and having a second terminal of its controlled current path connected to a first voltage output of a controlled current source, which first voltage output delivers a positive voltage appearing across the series circuit, and
- a second switching transistor having a first terminal of its controlled current path connected to the second terminal of the series circuit and having a second terminal of its controlled current path connected to a second voltage output of the controlled current source, which second voltage output determines a negative voltage appearing across the series circuit;
- a first capacitor of capacitance $C_1$ connected between the second output of the first switching transistor and ground; and
- a second capacitor of capacitance $C_2$ connected between the second output of the second switching transistor and ground,
  - said first and second capacitors and the aforementioned inductance L forming resonant circuits whose action is such that after each reversal of the coil current,
    - a resonant rise of the voltage across the T network occurs and,
    - during a rise of the coil current at the beginning of each of the aforementioned half-cycles, the coil current has a steeper leading edge than if the resonant circuit were not present.

U.S. Pat. No. 4,204,240 discloses a circuit arrangement with a voltage source for generating the coil current of an electromagnetic flow sensor which delivers a voltage having in each half-cycle an initial voltage value during a rise time of the coil current—as a first subcycle—which is higher than a final voltage value during a second subcycle representing the remainder of the half-cycle.

The cores and/or pole pieces of the magnetic system are generally made of soft magnetic material, but magnetic systems with ferromagnetic cores have also been described.

In both types of magnetic systems, the changeover and the rise of the coil current cause eddy currents to be induced in the magnetic system which prevent the rise of the magnetic field from exactly following the rise of the coil current, as would be the case without cores and/or pole pieces. By contrast, the rise of the magnetic field is delayed with respect to that of the coil current and levelled off. This disadvantageous effect of the eddy currents also occurs at and despite of the aforementioned resonant rise.

The effect of the eddy currents can be illustrated by an equivalent circuit diagram in which the (pure) inductance L is shunted by an eddy-current source whose current adds to the current in the (pure) inductance L to form a total coil current, which also flows through the resistor. Thus, the voltage drop across the resistor is only a measure of the total coil current, but not a measure of the (pure) coil current. This, however, is necessary for maintaining the coil current at a constant level.

In U.S. Pat. No. 4,784,000, a solution to this this overall problem is indicated in FIG. 6. It is assumed, however, that in the uncontrolled condition, the coil current during each total half-cycle is not constant, and sampling takes places twice in succession in a range in which the coil current is constant in the controlled condition. However, the two sampling operations in this range have turned out to be insufficient.

The invention serves to provide an improved solution to this overall problem; therefore, it is to provide a method which completely eliminates the detrimental effect of the eddy currents on the rise and the rise time of the magnetic field, so that the magnetic field reaches its constant final value already when the coil current assumes its maximum value.

SUMMARY OF THE INVENTION

To attain this object, a first variant of the invention provides a method of regulating the coil current flowing in a coil assembly
  which forms part of a magnetic system contained in an electromagnetic flow sensor and producing a magnetic field,
  which comprises a core and/or a pole piece, and
  which has an inductance L,
  said coil current being positive and having a constant first final current value in the first half of a cycle, and being negative and having a constant second final current value equal in magnitude to the first final current value in the second half of said cycle; and
  said coil current being generated by a circuit arrangement comprising:
    a bridge circuit in the form of an H network having
      a first bridge arm formed by the controlled current path of a first transistor,
      a second bridge arm formed by the controlled current path of a second transistor,
      a third bridge arm formed by the controlled current path of a third transistor, and
      a fourth bridge arm formed by the controlled current path of a fourth transistor,
      a first bridge diagonal between the second transistor, which is connected to the first transistor, and the fourth transistor, which is connected to the third transistor, and
      a second bridge diagonal between the third transistor, which is connected to the first transistor, and the fourth transistor, which is connected to the second transistor, wherein
        either the first and fourth transistors
        or the second and third transistors are simultaneously on;
    the coil assembly, which lies in the first bridge diagonal;
    a resistor connected to the H network so as to form a series circuit, a first terminal of which is connected to ground and which is traversed by the coil current; and
    a controlled voltage source which
      has a voltage output and
      determines a voltage developed across the series circuit;
        said voltage having in each half-cycle an initial voltage value during a rise time of the coil current—as a first subcycle—which is higher than a final voltage value during a second subcycle representing the remainder of the half-cycle;
said method using the voltage drop across the resistor,
  on the one hand, to maintain the final voltage value constant for forming the first and second final current values, and,
  on the other hand, to compensate for the effect of eddy currents, which are induced in the cores and/or the pole pieces during the rise of the coil current and which delay the leading edge of the magnetic field with respect to that of the coil current, by
    influencing in each half-cycle the rise time of the coil current and the magnitude of the final voltage value in such a manner that after the coil current has reached a maximum, no further rise of the coil current will occur, so that the magnetic field will reach a constant final value corresponding to the constant final value of the coil current already when the coil current reaches its maximum,
    with the waveform of the voltage drop across the resistor during a half-cycle after the maximum of the coil current until the attainment of the final current value being sampled at least three times in succession to form a correction quantity for the voltage across the H network in the next half-cycle.

To attain the above-mentioned object, a second variant of the invention provides a method of regulating the coil current flowing in a coil assembly
  which forms part of a magnetic system contained in an electromagnetic flow sensor and producing a magnetic field,
  which comprises a core and/or a pole piece, and
  which has an inductance L,
  said coil current being positive and having a constant first final current value in the first half of a cycle, and being negative and having a constant second final current value equal in magnitude to the first final value in the second half of said cycle; and
  said coil current being generated by a circuit arrangement comprising:
    a controlled voltage source having a first voltage ouput and a second voltage output, and
    a T network comprising:
      a resistor connected to the coil assembly so as to form a series circuit, a first terminal of which is connected to ground and which is traversed by the coil current,
      a first switching transistor having a first terminal of its controlled current path connected to a second terminal of the series circuit and having a second terminal of its controlled current path connected to the first voltage output of a controlled current source, which first voltage output delivers a positive voltage appearing across the series circuit, and
      a second switching transistor having a first terminal of its controlled current path connected to the second terminal of the series circuit and having a second terminal of its controlled current path connected to the second voltage output of the controlled current source, which second voltage output delivers a negative voltage appearing across the series circuit,
        said positive and negative voltages having in each half-cycle a positive initial voltage value and a negative initial voltage value, respectively, during a rise time of the coil current—as a first subcycle—which are higher than a positive final voltage value during a second subcycle as the remainder of the half-cycle and lower than a negative final voltage value during said second subcycle, respectively; said method using the voltage drop across the resistor, on the one hand, to maintain the positive and negative final voltage values constant for forming the first and second final current values, respectively, and on the other hand, to compensate for the effect of eddy currents which are induced in the cores and/or the pole pieces during the rise of the coil current and which delay the leading edge of the magnetic field with respect to that of the coil current, by influencing in each half-cycle the rise time of the coil current and the magnitude of the positive and negative final voltage values in such a manner that after the coil current has reached a maximum, no further rise of the coil current will occur, so that the magnetic field will reach a constant final value corresponding to the constant final value of the coil current already when the coil current reaches the maximum, with the waveform of the voltage drop across the resistor during a half-cycle after the maximum of the coil current until the attainment of the final current value being sampled at least three times in succession to form a correction quantity for the voltage across the T network in the next half-cycle.

According to a further development of the first variant of the invention, a first terminal of the resistor is connected to the voltage output of the voltage source, a second terminal of the resistor is connected to the junction point of the first and second transistors of the H network via a diode whose forward direction is equal to the direction of the coil current, while the junction point of the second and fourth transistors is connected to ground, and the H network is bypassed by a capacitor of capacitance C, said capacitor and the inductance L forming a resonant circuit whose action is such that a resonant rise of the voltage across the H network occurs, and that during its rise time, the coil current has a steeper leading edge than if the resonant circuit were not present.

According to a further development of the second variant of the invention, the coil assembly is connected to ground;

the resistor is connected between the junction point of the first and second switching transistors and the coil assembly;

a second terminal of the first switching transistor is connected via the cathode-anode path of a first diode to the first voltage output of the controlled voltage source and via a first capacitor of capacitance $C_1$ to ground; and a second terminal of the second switching transistor is connected via the anode-cathode path of a second diode to the second voltage output of the controlled voltage source and via a second capacitor of capacitance $C_2$ to ground, said first and second capacitors and the inductance L forming respective resonant circuits whose action is such that a resonant rise of the voltage across the series circuit occurs, and that during its rise time, the coil current has a steeper leading edge than if the resonant circuit were not present.

The fundamental idea of the two variants of the invention is to selectively precalculate the voltage required to generate the coil current in each half-cycle and the time variation of this voltage using that variation of the coil current in the preceding half-cycle which occurs after the maximum of the coil current until the attainment of the constant final current value.

One advantage of the invention lies in the fact that for the first time a method is provided which ensures that the rise of the magnetic field follows exactly the rise of the coil current, as is the case with coil systems without cores and/or pole pieces. The magnetic field thus reaches its constant final value at an earlier time than would be the case without the invention.

BRIEF DESCRIPTION OF THE DRAWINGS

The invention will become more apparent from the following description of embodiments when taken in conjunction with the accompanying drawings, in which:

FIG. 7b is a similar flowchart to be connected to point A of FIG. 7a.

DETAILED DESCRIPTION OF PREFERRED EMBODIMENTS

Figure 1:
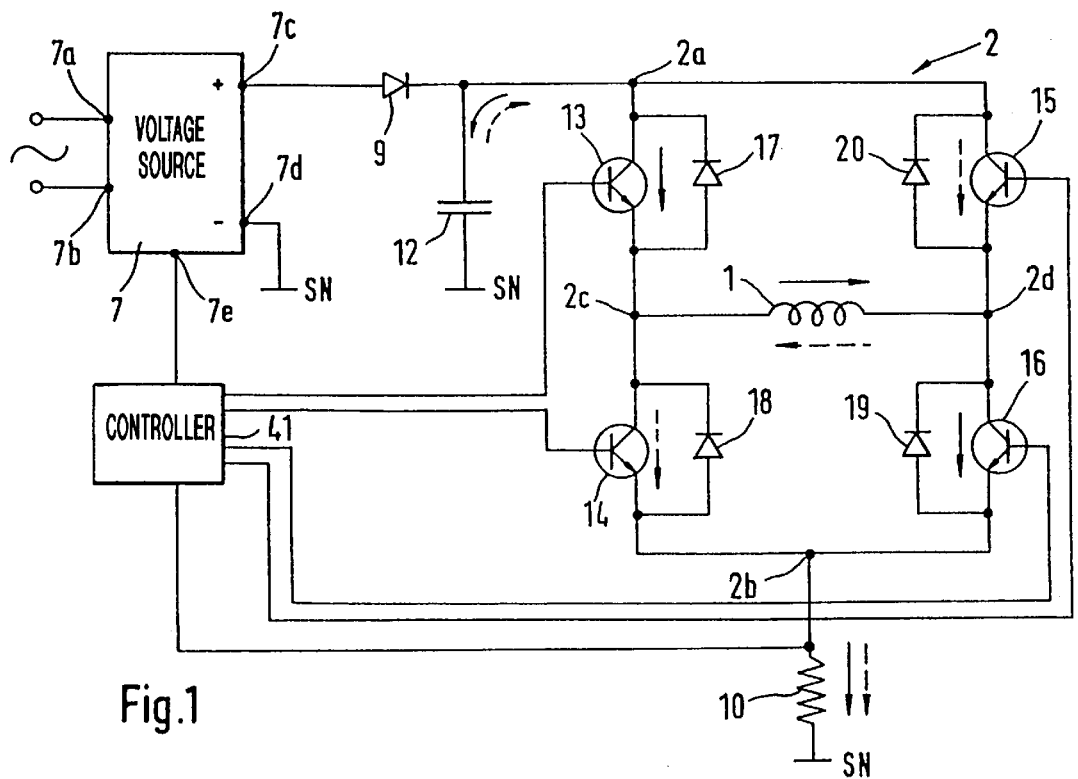
FIG. 1 is a schematic circuit diagram of a first embodiment with an H network.
Figure 2:
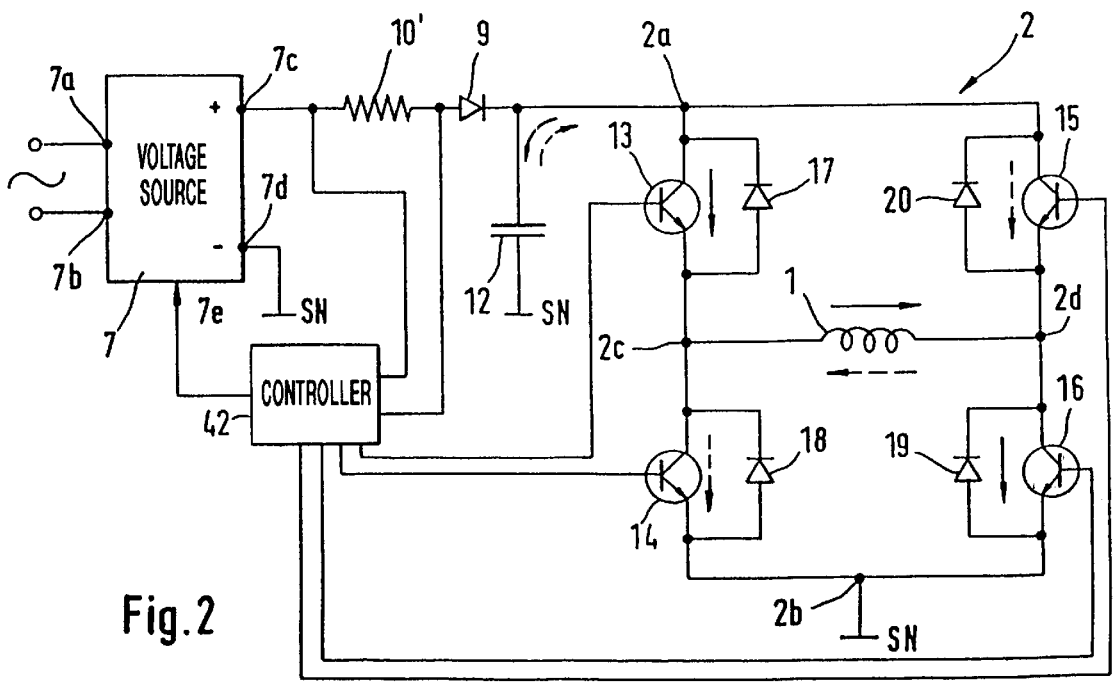
FIG. 2 is a schematic circuit diagram of a second embodiment with an H network.

FIGS. 1 and 2 show embodiments in which the respective bridge circuit is implemented as an H network 2. A first bridge arm contains the controlled current path of a first transistor 13, a second bridge arm the controlled current path of a second transistor 14, a third bridge arm the controlled current path of a third transistor 15, and a fourth bridge arm the controlled current path of a fourth transistor 16.

With this configuration, four corner points 2a, 2b, 2c, 2d of the H network are obtained: Transistors 13, 14 are interconnected by corner point 2c, transistors 14, 16 by corner point 2b, transistors 15, 16 by corner point 2d, and transistors 13, 15 by corner point 2a.

A first bridge diagonal interconnects the corner points 2a, 2b, and a second bridge diagonal interconnects the corner points 2c, 2d. The second bridge diagonal contains a coil assembly 1, i.e., first and second terminals of the coil assembly are connected to corner points 2c and 2d, respectively.

In operation, either the first and fourth transistors 13, 16 or the second and third transistors 14, 15 are simultaneously on. Thus, in the first case (transistors 13, 16 on), a current (assumed to be positive) can flow from corner point 2a to corner point 2b through the coil assembly 1 in the direction indicated by the continuously drawn arrow. If transistors 14, 15 are on, the same current flows through the coil assembly 1 in the reverse direction, as is indicated by the dashed arrow.

The coil assembly 1 has an inductance L and forms part of a magnetic system producing a magnetic field in an electromagnetic flow sensor, which is not shown, as the mechanical construction of such sensors is familiar to those skilled in the art, see the above-mentioned U.S. Pat. No. 4,204,240. For the invention it is only of interest that the magnetic system comprises a core and/or a pole piece.

As is also familiar to those skilled in the art, the coil current is generated by the aforementioned alternate turning on of the transistors 13, 16 and 14, 15 such that in the first half of a cycle, it is positive and has a constant first final current value, while in the second half of this cycle, it is negative and has a constant second final current value equal in magnitude to the first final current value. "Final current value" as used herein means that constant value of the coil current, e.g., 85 mA, which flows in the other current direction prior to the change-over.

In FIG. 1, corner point 2c is connected to ground SN through a resistor 10. The resistor 10 and the H network 2 form a series circuit, the resistor 10 being traversed by the coil current.

FIG. 1 also shows a controlled voltage source 7 which has a voltage output 7c and determines a voltage appearing across the series circuit, i.e., between corner point 2a and ground SN; this voltage is assumed here to be positive, cf. the plus sign at the output 7c. The controlled voltage source 7 is mains-powered supplied with AC electrical power via two input terminals 7a, 7b; it is connected to ground SN via an output 7d.

The voltage at the output 7c is applied via the anode-cathode path of a diode 9 to corner point 2a. A capacitor 12 of capacitance C is connected from the cathode of diode 9 and the corner point 2a to ground SN.

In FIG. 2, the order of the coil assembly and the resistor in the series circuit has been interchanged: The corner point 2b of the H network 2 is now connected directly to ground, and the resistor, now designated 10', is connected between the output 7c of the controlled voltage source 7 and the anode of diode 9.

This has the advantage that any short circuit between the corner points 2c, 2d, i.e., in the coil assembly 2, for example, cannot destroy the currently conducting transistors 13, 16 or 14, 15, since the coil current is limited by the resistor 10'.

Figure 3:
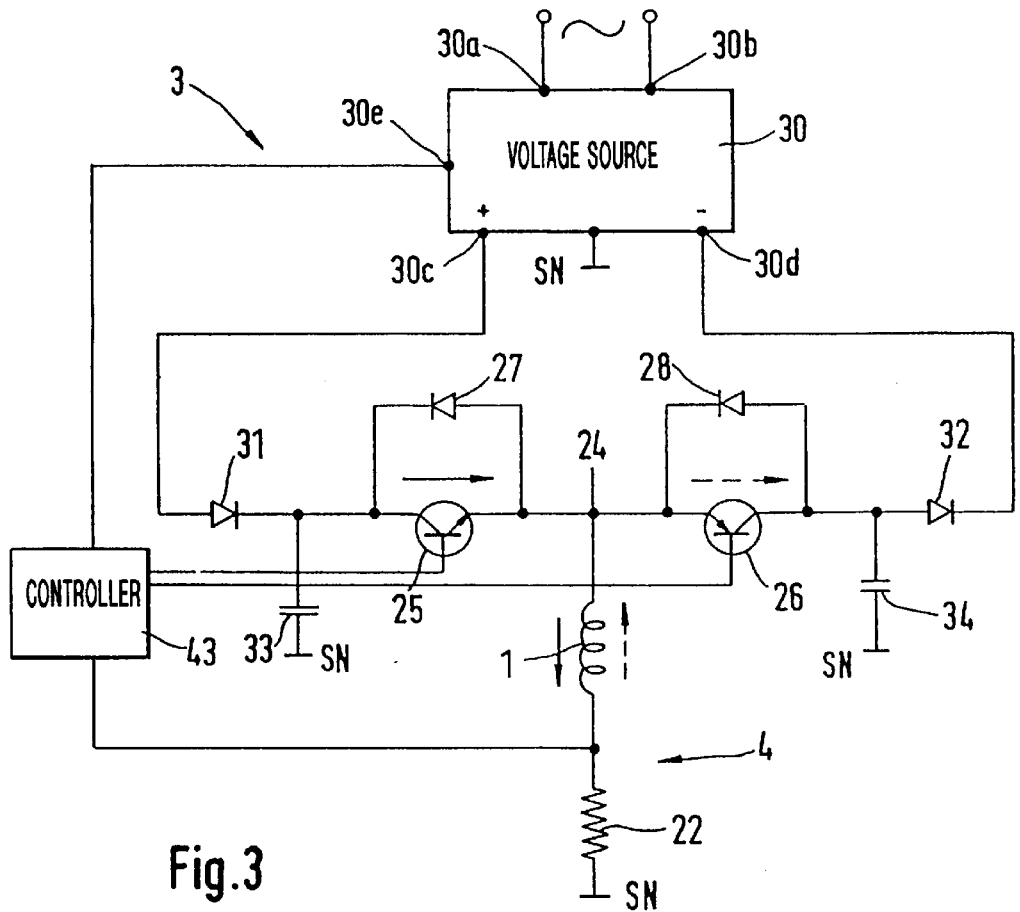
FIG. 3 is a schematic circuit diagram of a first embodiment with a T network.
Figure 4:
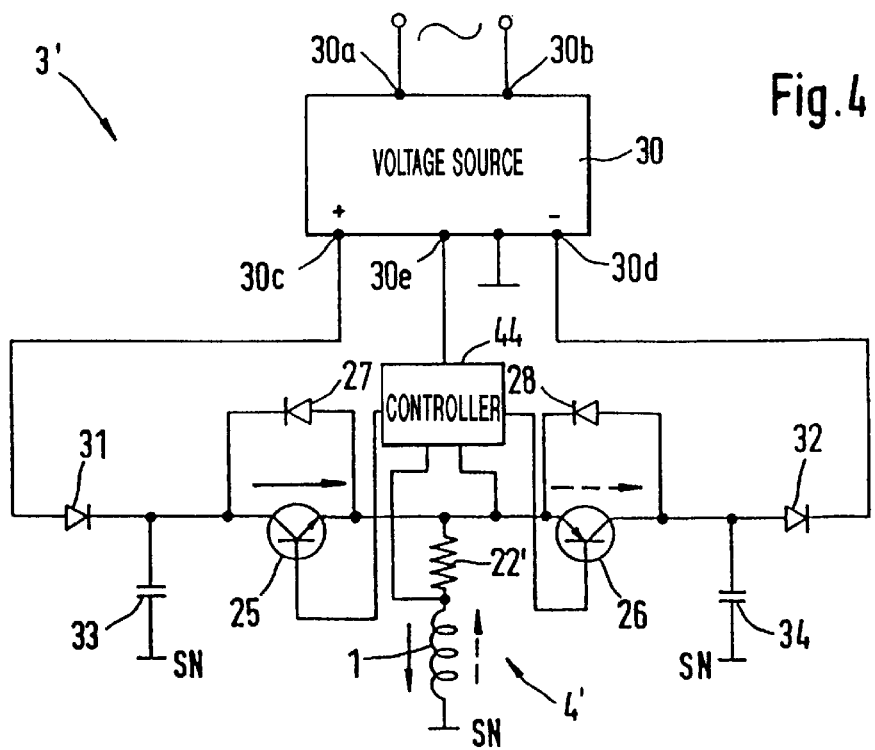
FIG. 4 is a schematic circuit diagram of a second embodiment with a T network.

FIGS. 3 and 4 show embodiments in which the respective bridge circuit is implemented as a T network 3, 3'. A resistor 22, 22' and the coil assembly 1 form a series circuit 4, 4'. In the embodiment of FIG. 3, the coil assembly 1 is connected to ground SN through the resistor 22, and the series circuit is traversed by the coil current. In FIG. 4, the first terminal of the series circuit 4' is connected to ground SN.

A first terminal of the controlled current path of a first switching transistor 25 is connected to a second terminal of the series circuit 4, 4'. A second terminal of this controlled current path is connected to a first output 30c of a controlled voltage source 30; this output 30c determines a positive voltage appearing across the series circuit, cf. the plus sign at the output 30c.

A first terminal of the controlled current path of a second switching transistor 26 is connected to the second terminal of the series circuit 4, 4'. A second terminal of this current path is connected to a second output 30d of the controlled voltage source 30; this second output 30d determines a negative voltage appearing across the series circuit, cf. the minus sign at the output 30d.

The switching transistors 25, 26 are alternately turned on, so that the coil current alternately reverses its direction, as indicated by the two arrows at the coil assembly 1. In this embodiment, too, the coil current is positive in the first half of a cycle and has a constant first final current value in this first half, while in the second half of this cycle, it is negative and has a constant second final current value equal in magnitude to the first final current value.

In FIGS. 3 and 4, the positive voltage at the output 30c of the voltage source 30 is applied via the anode-cathode path of a first diode 31 to the second terminal of the switching transistor 25. A first capacitor 33 of capacitance $C_1$ is connected from this terminal of switching transistor 25 and the cathode of diode 31 to ground SN.

The negative voltage at the output 30d of the voltage source 30 is applied via the cathode-anode path of a second diode 32 to the second terminal of the switching transistor 26. A second capacitor 34 of capacitance $C_2$ is connected from this terminal of switching transistor 26 and the cathode of diode 32 to ground SN.

In the embodiments of FIGS. 1 and 2 or 3 and 4, a respective resonant circuit is formed by the inductance L of the coil assembly 1 and the capacitance C of the capacitor 12 or by the inductance L and the capacitances $C_1$ and $C_2$ of capacitors 33 and 34, respectively. As a result, a resonant rise of the voltage across the series circuit occurs, and during a rise of the coil current at the beginning of each half-cycle, the coil current has a steeper leading edge than if the resonant circuit were not present.

In the invention, the voltage source 7, 30 is controlled, as will be further explained below, to provide in a first subcycle of each half-cycle of the coil current, hereinafter referred to as the "rise time $t_a$", an initial voltage value $U_a$ which is higher, e.g., several times higher, than a constant final voltage value $U_c$ during a second subcycle, hereinafter referred to as the "remain-ing time $t_c$", cf. FIGS. 5a and 5b.

Furthermore, the voltage drop across the resistor 10, 10', 22, 22' is used to compensate for the effect of eddy currents which are induced in the cores and/or the pole pieces during the rise of the coil current and which delay the leading edge of the magnetic field with respect to the leading edge of the coil current.

Figure 5A:
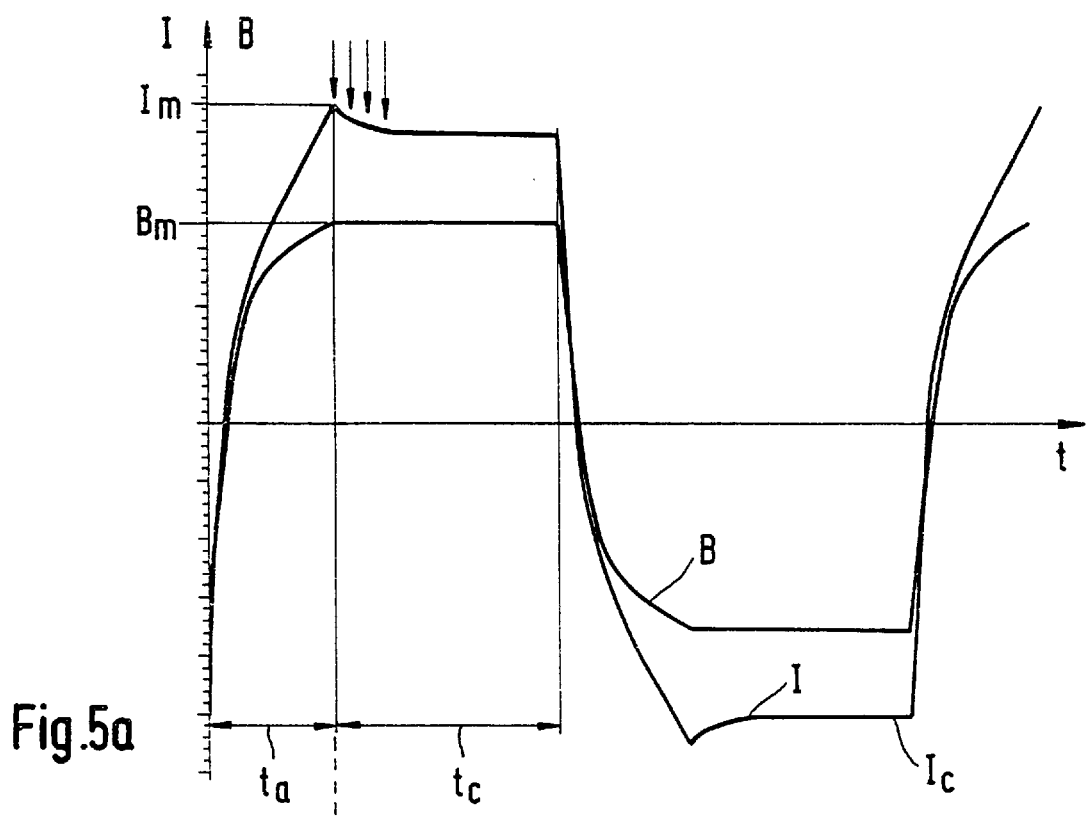
FIG. 5a shows the curves of the coil current and the magnetic induction.

This is achieved by controlling the rise time $t_a$ of the coil current and the magnitude of the positive or negative final voltage value $U_c$ in each half-cycle in such a way that, on the one hand, no further rise of the coil current will occur after the latter has reached a maximum $I_m$, so that the magnetic field will reach a constant final value $B_m$ corresponding to the constant final value of the coil current already when the coil current reaches the maximum $I_m$, cf. FIG. 5a, and that, on the other hand, the magnitude of the positive or negative final voltage value $U_c$ always causes the constant final current value $I_c$ of, e.g., 85 mA.

This accomplished by sampling the waveform of the voltage drop across the resistor during a half cycle after the maximum $I_m$ of the coil current at least three times to form a correction quantity across the H network or the T network in the next half-cycle.

In FIG. 5a, the coil current I and the induction B of the magnetic field are plotted against the time t. In the first half-cycle, with a positive coil current I, it is shown that the half-cycle consists of a rise time $t_a$ and a remaining time $t_c$ the latter is equal to the time during which the induction B of the magnetic field is constant.

During the rise time $t_a$, the coil current I, on the one hand, rises steeply, then, after reaching a maximum $I_m$, falls off, and reaches its constant final value later than the induction B, cf. the gradual decrease of the coil current after the maximum $I_m$. This behavior of the coil current is due to the above-explained eddy currents induced in the cores and/or pole pieces. The instant at which the current maximum $I_m$ is reached determines the boundary line between the rise time $t_a$ and the remaining time $t_c$.

During the rise time $t_a$ the induction B, on the other hand, first rises nearly as steeply as the coil current, then becomes more level, and reaches its constant final value $B_m$ already at the end of the rise time $t_a$, as intended.

Arrows shown above the decaying portion of the coil-current curve during the remaining time $t_c$ indicate that the coil-current waveform decaying to the final current value $I_m$ is sampled at least three times, for example every millisecond; in the example of FIG. 5a, the decaying portion of the coil current is sampled four times. From the sample values, the control signal for the controlled voltage source is derived in accordance with the invention, as will be explained in detail below.

Figure 5B:
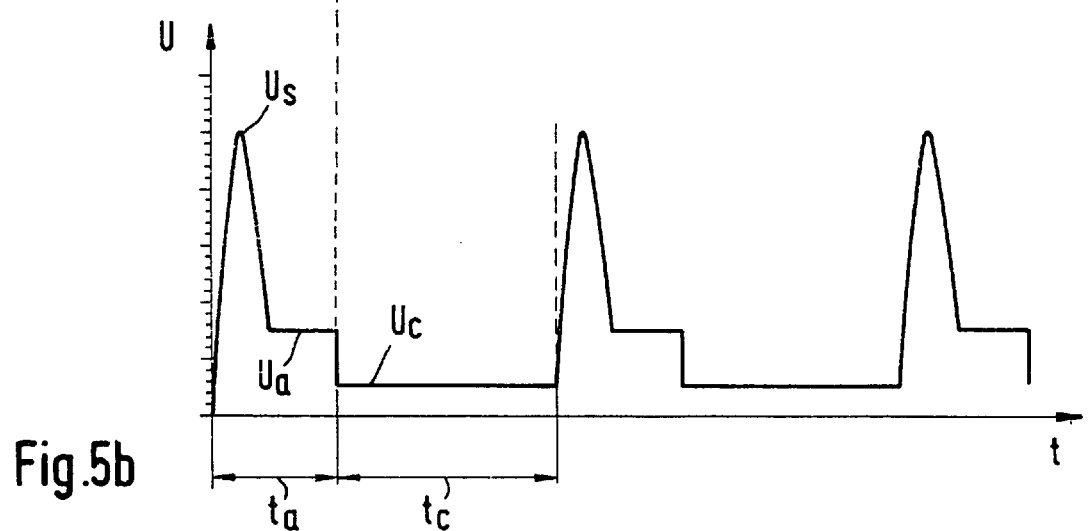
FIG. 5b shows the waveform of the voltage of the voltage source.

In FIG. 5b, the voltage across the series circuit including the H or T network is plotted against time, t. The first peak $U_s$ is due to the aforementioned resonant rise. The subsequent constant value is the aforementioned initial voltage value $U_a$, which contributes to the steepening of the coil-current rise.

Without a resonant rise, only the initial voltage value $U_a$ would be present throughout the rise time $t_a$. During the remaining time $t_c$, the constant final voltage value $U_c$ is present. From FIG. 5b it is apparent that, as mentioned above, the initial voltage value $U_a$ is greater than the final voltage value $U_b$.

In FIGS. 1 to 4, the control of the voltage source 7, 30 is illustrated by controllers 41, 42, 43, 44, respectively. The controllers 41, 42 are inserted between the resistors 10 and 10', respectively, and a control input 7e of the voltage source 7. The controllers 43, 44 are inserted between the resistors 22 and 22', respectively, and a control input 30e of the voltage source 30. The controllers 41, 42 also control the resistors 13, 14, 15, 16 of the H network, and the controllers 43, 44 also control the resistors 25, 26 of the T network.

The controller 41, 42, 43, 44 is essentially implemented with a suitably programmed microprocessor. The latter is preceded by an analog-to-digital converter which digitizes the voltage drop across the resistor 10, 10', 22, 22'. The microprocessor and the analog-to-digital converter are, of course, clocked by a clock oscillator.

Figure 6:
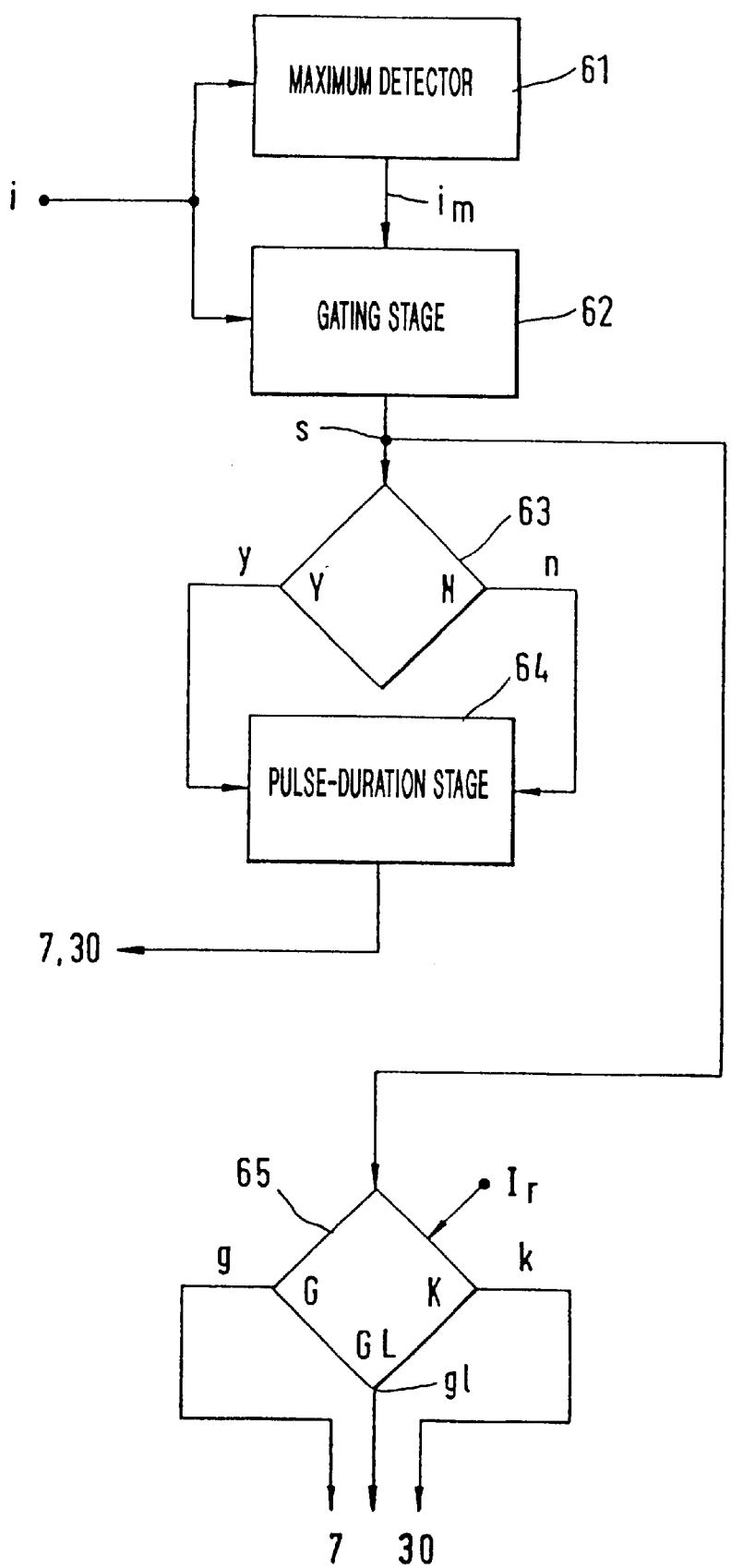
FIG. 6 is a flowchart showing the steps of the program of the microprocessor used in the invention.

Preferably, the microprocessor is programmed according to the flowchart of FIG. 6, in which suitable functional and decision blocks are shown. Small letters have been used to designate digital signals which are important for the flowchart.

By means of the aforementioned analog-to-digital converter, a voltage drop across the resistor is digitized, so that a digital signal i representative of the coil current I is obtained. This digital signal i is applied to the input of a maximum detector 61 and to the input of a gating stage 62 which is also fed by a maximum signal $i_m$ from the maximum detector 61. The gating stage 62 passes on only those portions of the digital signal i as current samples s which occur later than the maximum signal $i_m$.

A first decision stage 63 checks successive, adjacent current samples s to determine whether the later sample is greater than the earlier one, i.e., whether the coil current between two samples has risen; if that is the case, it provides a control signal y at a YES output Y, and if not, it provides a control signal n at a NO output N.

The control signal y causes a pulse-duration stage 64 to lengthen the rise time $t_a$, and the control signal n causes the pulse-duration stage 64 to lengthen the remaining time $t_c$. An output of the pulse-duration stage is coupled to the voltage source 7, 30.

A second decision stage 65 continuously checks the current samples s to determine whether a current sample s is greater than, equal to, or less than a current reference value $i_r$ which is proportional to, and determines, the final current value $I_c$. If that is the case, the decision stage 65 provides a control signal g at a GREATER output G, a control signal gl at an EQUAL output GL, or a control signal k at a LESS output K.

These control signals g, gl, k are fed to the voltage source 7, 30, if necessary through a digital-to-analog converter, and act on the initial voltage value $U_a$ provided by the voltage source in a cycle of the coil current: The control signal g increases the initial voltage value $U_a$ in the subsequent cycle, or the control signal gl leaves it unchanged in the subsequent cycle, or the control signal k reduces it in the subsequent cycle.

One skilled in the art will recognize that the control and operation of transistors 13, 14, 15, 16, 25 and 26 of FIGS. 1 to 4 can be accomplished as taught in U.S. Pat. No. 4,410,926, which is incorporated herein by reference. Furthermore, the controlled current paths of the transistors 13, 14, 15, 16, 25 and 26 are bypassed by freewheeling diodes 17, 18, 19, 20, 27 and 28, respectively.

The transistors are shown as bipolar transistors, but it is also possible, of course, to use field-effect transistors, particularly insulated-gate field-effect transistors.

Figure 7A:
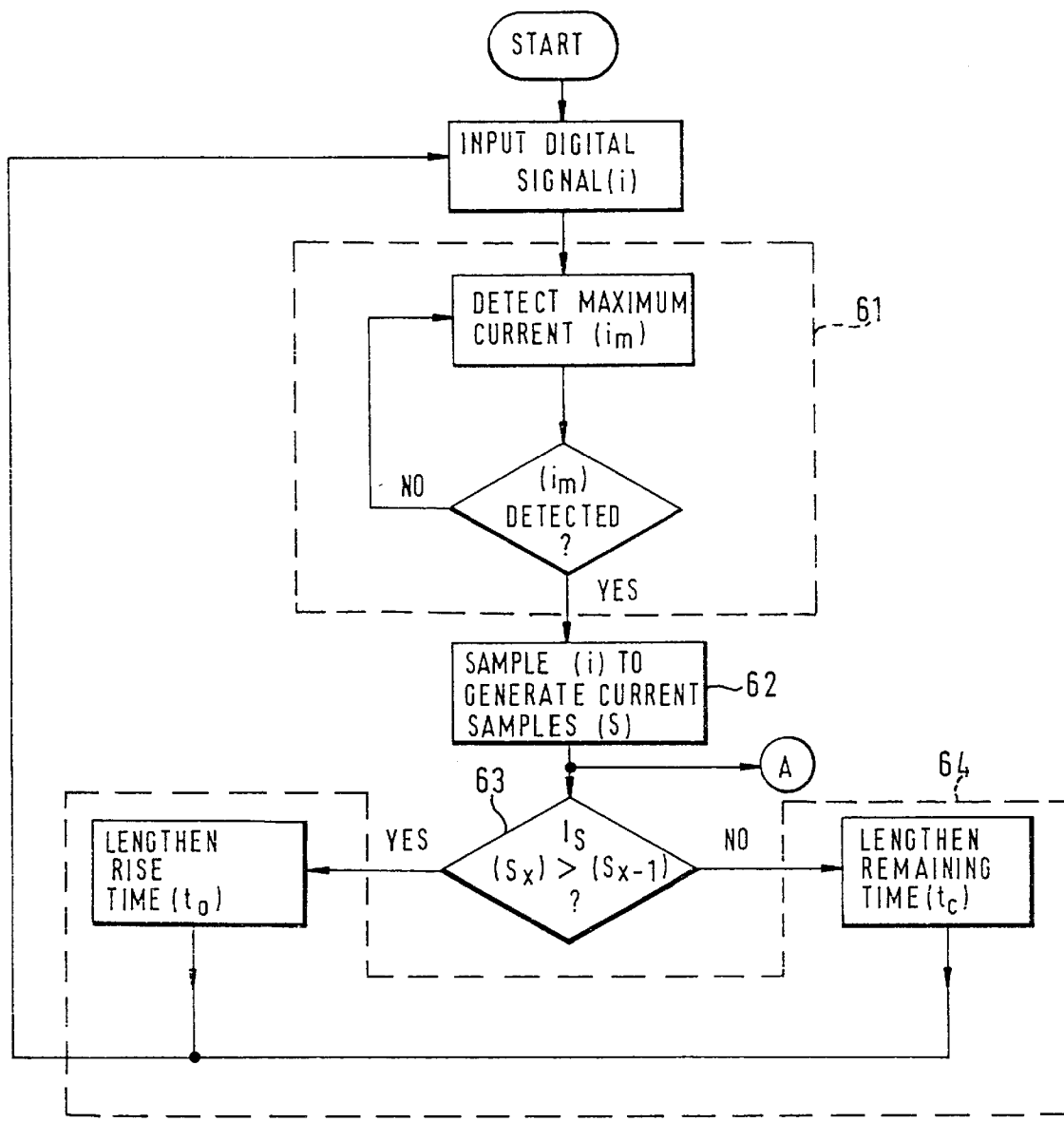
FIG. 7a is a flowchart which contains only decision boxes and, because of the inscriptions contained therein, are self-explanatory.
Figure 7B:
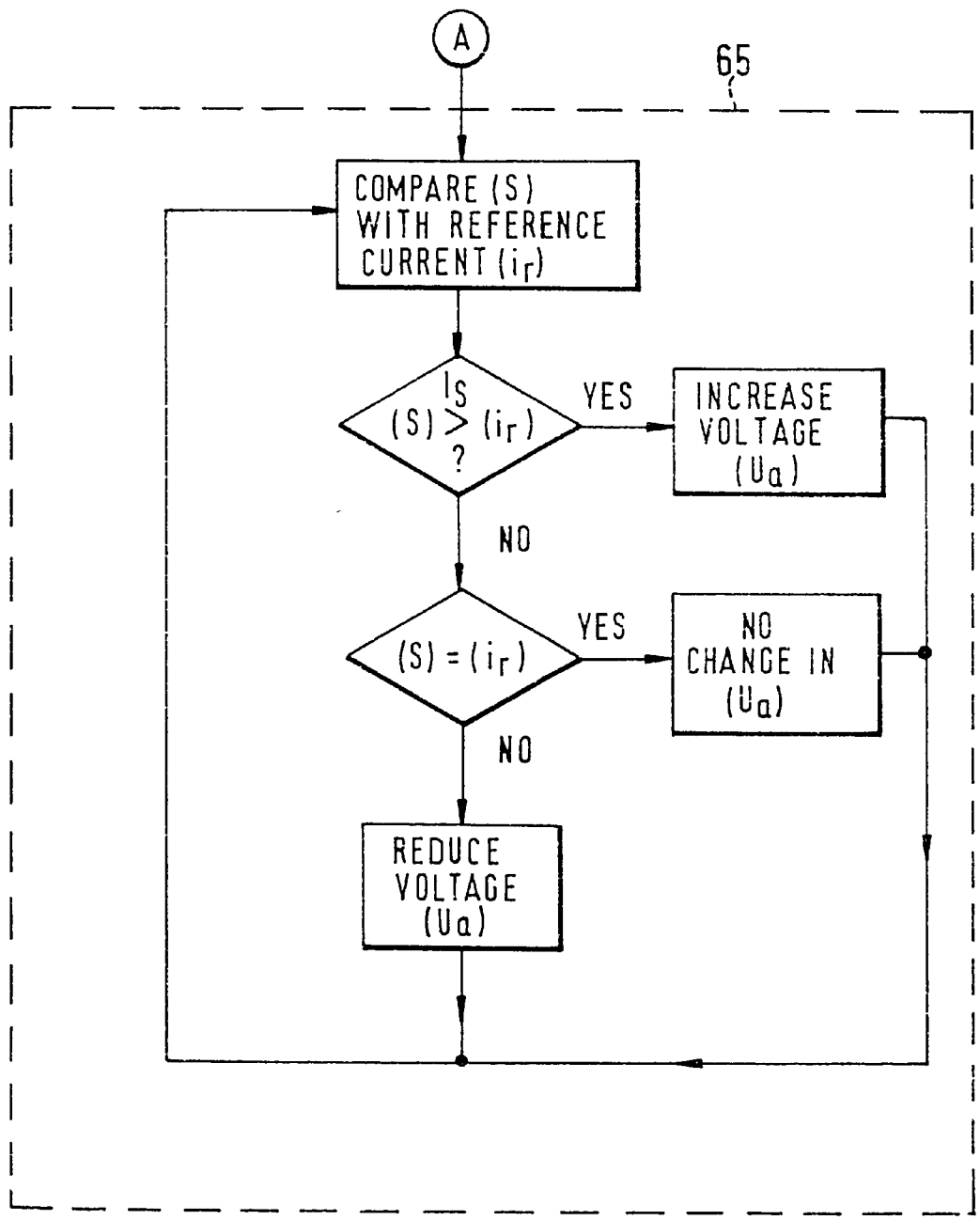

The flowcharts of FIGS. 7a and 7b, which contain decision boxes provided with inscriptions and are self-explanatory, permit a further understanding of FIG. 6. FIG. 7b has to be joined to FIG. 7a at A.

I claim:

1. A method of regulating the coil current flowing in a coil assembly
   which forms part of a magnetic system contained in an electromagnetic flow sensor and producing a magnetic field,
   which comprises a core and/or a pole piece, and
   which has an inductance L,
   said coil current being positive and having a constant first final current value in the first half of a cycle, and being negative and having a constant second final current value equal in magnitude to the first final current value in the second half of said cycle; and
   said coil current being generated by a circuit arrangement comprising:
      a bridge circuit in the form of an H network having
         a first bridge arm formed by the controlled current path of a first transistor, a second bridge arm formed by the controlled current path of a second transistor, a third bridge arm formed by the controlled current path of a third transistor, and a fourth bridge arm formed by the controlled current path of a fourth transistor, a first bridge diagonal between the second transistor, which is connected to the first transistor, and the fourth transistor, which is connected to the third transistor, and a second bridge diagonal between the third transistor, which is connected to the first transistor, and the fourth transistor, which is connected to the second transistor, wherein either the first and fourth transistors or the second and third transistors are simultaneously on;

the coil assembly, which lies in the first bridge diagonal;

a resistor connected to the H network so as to form a series circuit, a first terminal of which is connected to ground and which is traversed by the coil current; and a controlled voltage source which has a voltage output and determines a voltage developed across the series circuit;

said voltage having in each half-cycle an initial voltage value during a rise time of the coil current—as a first subcycle—which is higher than a final voltage value during a second subcycle representing the remainder of the half-cycle;

said method using the voltage drop across the resistor, on the one hand, to maintain the final voltage value constant for forming the first and second final current values, and, on the other hand, to compensate for the effect of eddy currents, which are induced in the cores and/or the pole pieces during the rise of the coil current and which delay the leading edge of the magnetic field with respect to that of the coil current, by influencing in each half-cycle the rise time of the coil current and the magnitude of the final voltage value in such a manner that after the coil current has reached a maximum, no further rise of the coil current will occur, so that the magnetic field will reach a constant final value corresponding to the constant final value of the coil current already when the coil current reaches its maximum, with the waveform of the voltage drop across the resistor during a half-cycle after the maximum of the coil current until the attainment of the final current value being sampled at least three times in succession to form a correction quantity for the voltage across the H network in the next half-cycle.

2. A method of regulating the coil current flowing in a coil assembly which forms part of a magnetic system contained in an electromagnetic flow sensor and producing a magnetic field, which comprises a core and/or a pole piece, and which has an inductance L, said coil current being positive and having a constant first final current value in the first half of a cycle, and being negative and having a constant second final current value equal in magnitude to the first final value in the second half of said cycle; and said coil current being generated by a circuit arrangement comprising:

a controlled voltage source having a first voltage ouput and a second voltage output, and a T network comprising:

a resistor connected to the coil assembly so as to form a series circuit, a first terminal of which is connected to ground and which is traversed by the coil current, a first switching transistor having a first terminal of its controlled current path connected to a second terminal of the series circuit and having a second terminal of its controlled current path connected to the first voltage output of a controlled current source, which first voltage output delivers a positive voltage appearing across the series circuit, and a second switching transistor having a first terminal of its controlled current path connected to the second terminal of the series circuit and having a second terminal of its controlled current path connected to the second voltage output of the controlled current source, which second voltage output delivers a negative voltage appearing across the series circuit, said positive and negative voltages having in each half-cycle a positive initial voltage value and a negative initial voltage value, respectively, during a rise time of the coil current—as a first subcycle—which are higher than a positive final voltage value during a second subcycle as the remainder of the half-cycle and lower than a negative final voltage value during said second subcycle, respectively;

said method using the voltage drop across the resistor, on the one hand, to maintain the positive and negative final voltage values constant for forming the first and second final current values, respectively, and on the other hand, to compensate for the effect of eddy currents which are induced in the cores and/or the pole pieces during the rise of the coil current and which delay the leading edge of the magnetic field with respect to that of the coil current, by influencing in each half-cycle the rise time of the coil current and the magnitude of the positive and negative final voltage values in such a manner that after the coil current has reached a maximum, no further rise of the coil current will occur, so that the magnetic field will reach a constant final value corresponding to the constant final value of the coil current already when the coil current reaches the maximum, with the waveform of the voltage drop across the resistor during a half-cycle after the maximum of the coil current until the attainment of the final current value being sampled at least three times in succession to form a correction quantity for the voltage across the T network in the next half-cycle.

3. The method of claim 1, in which a first terminal of the resistor is connected to the voltage output of the voltage source, a second terminal of the resistor is connected to the junction point of the first and second transistors of the H network via a diode whose forward direction is equal to the direction of the coil current, while the junction point of the second and fourth transistors is connected to ground, and the H network is bypassed by a capacitor of capacitance C,
   said capacitor and the inductance L forming a resonant circuit whose action is such that
      a resonant rise of the voltage across the H network occurs, and
      that during its rise time, the coil current has a steeper leading edge than if the resonant circuit were not present.

4. The method of claim 2, in which the coil assembly is connected to ground;

the resistor is connected between the junction point of the first and second switching transistors and the coil assembly;

a second terminal of the first switching transistor is connected
   via the cathode-anode path of a first diode to the first voltage output of the controlled voltage source and
   via a first capacitor of capacitance $C_1$ to ground; and a second terminal of the second switching transistor is connected
   via the anode-cathode path of a second diode to the second voltage output of the controlled voltage source and
   via a second capacitor of capacitance $C_2$ to ground,
      said first and second capacitors and the inductance L forming respective resonant circuits whose action is such that
         a resonant rise of the voltage across the series circuit occurs, and
         that during its rise time, the coil current has a steeper leading edge than if the resonant circuit were not present.

* * * * *